(12) United States Patent
Singor (10) Patent No.: US 7,508,235 B2
(45) Date of Patent: Mar. 24, 2009

(54) DIFFERENTIAL LINE TERMINATION TECHNIQUE

(75) Inventor: Henry Singor, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 367 days.

(21) Appl. No.: 11/422,789

(22) Filed: Jun. 7, 2006

(65) Prior Publication Data

US 2007/0285128 A1    Dec. 13, 2007

(51) Int. Cl.
*H03K 19/094* (2006.01)
(52) U.S. Cl. .......................................... 326/82; 326/27
(58) Field of Classification Search ................ 326/26, 326/27, 30, 82–87
See application file for complete search history.

(56) References Cited

U.S. PATENT DOCUMENTS

| | | | |
|---|---|---|---|
| 5,121,080 A | 6/1992 | Scott, III et al. | |
| 5,374,861 A | 12/1994 | Kubista | |
| 5,402,485 A | 3/1995 | Takato et al. | |
| 5,550,496 A | 8/1996 | Desroches | |
| 5,570,037 A | 10/1996 | Llorens | |
| 5,939,904 A | 8/1999 | Fetterman et al. | |
| 6,028,479 A | 2/2000 | Babanezhad | |
| 6,054,881 A | 4/2000 | Stoenner | |
| 6,147,520 A | 11/2000 | Kothandaraman et al. | |
| 6,280,011 B1 | 8/2001 | Schloeman et al. | |
| 6,281,702 B1 | 8/2001 | Hui | |
| 6,300,802 B1 | 10/2001 | Smetana | |
| 6,373,277 B1 * | 4/2002 | Felder | 326/30 |
| 6,433,579 B1 | 8/2002 | Wang et al. | |
| 6,437,599 B1 | 8/2002 | Groen | |
| 6,445,223 B1 | 9/2002 | Thilenius | |
| 6,504,397 B1 | 1/2003 | Hart et al. | |
| 6,529,070 B1 | 3/2003 | Nagaraj | |
| 6,580,292 B2 | 6/2003 | West et al. | |
| 6,603,329 B1 | 8/2003 | Wang et al. | |
| 6,664,814 B1 | 12/2003 | Evans et al. | |
| 6,670,830 B2 | 12/2003 | Otsuka et al. | |
| 6,700,403 B1 | 3/2004 | Dillon | |
| 6,744,275 B2 | 6/2004 | Chansungsan | |
| 6,744,280 B2 | 6/2004 | Morgan et al. | |
| 6,760,381 B2 | 7/2004 | Lu | |

(Continued)

OTHER PUBLICATIONS

Boni, Andrea, et al., "LVDS I/O Interface for Gb/s-per-Pin Operation in 0.35-μm CMOS," *IEEE Journal of Solid-State Circuits*, vol. 36, No. 4, Apr. 2001, pp. 706-711.

(Continued)

*Primary Examiner*—Don P Le
(74) *Attorney, Agent, or Firm*—Zagorin O'Brien Graham LLP (57) ABSTRACT

A technique for terminating a differential signal line substantially matches the output impedances of a first node and a second node of a differential node. The power dissipation is substantially less than twice the power delivered to a load impedance coupled to the differential signal line. The technique provides a peak-to-peak, single-ended output voltage on the differential output node that is substantially independent of integrated circuit manufacturing process tolerances. An apparatus includes a differential node coupled to provide a differential signal. The differential node includes a first node and a second node. A first single-ended termination circuit is coupled to the first node and responsive to a first reference voltage. The apparatus includes a second single-ended termination circuit coupled to the second node and responsive to a second reference voltage.

28 Claims, 5 Drawing Sheets

U.S. PATENT DOCUMENTS

| | | | |
|---|---|---|---|
| 6,812,734 | B1 | 11/2004 | Shumarayev et al. |
| 6,812,735 | B1* | 11/2004 | Pham .......................... 326/30 |
| 6,815,980 | B2 | 11/2004 | Kerr |
| 6,856,178 | B1 | 2/2005 | Narayan |
| 6,940,302 | B1 | 9/2005 | Shumarayev et al. |
| 6,963,219 | B1 | 11/2005 | Ghia et al. |
| 7,012,450 | B1 | 3/2006 | Oner et al. |
| 7,034,574 | B1 | 4/2006 | Li |
| 7,088,181 | B1 | 8/2006 | Voo |
| 7,145,359 | B2 | 12/2006 | Hein et al. |
| 7,205,787 | B1* | 4/2007 | Massoumi et al. ............ 326/30 |
| 2004/0174215 | A1 | 9/2004 | Li et al. |
| 2005/0184805 | A1 | 8/2005 | Murakami |
| 2005/0189961 | A1* | 9/2005 | Frans et al. .................... 326/30 |
| 2005/0212553 | A1 | 9/2005 | Best et al. |
| 2005/0237082 | A1 | 10/2005 | Shumarayev et al. |
| 2005/0285629 | A1 | 12/2005 | Hein et al. |
| 2006/0022753 | A1 | 2/2006 | Bonaccio et al. |
| 2006/0071683 | A1* | 4/2006 | Best et al. ..................... 326/30 |
| 2006/0082415 | A1 | 4/2006 | Gopinathan et al. |
| 2006/0091931 | A1 | 5/2006 | Leete |

OTHER PUBLICATIONS

Chen, Mingdeng, et al., "Low-Voltage Low-Power LVDS Drivers," *IEEE Journal of Solid-State Circuits*, vol. 40, No. 2, Feb. 2005, pp. 472-479.

Goldie, John, "LVDS, CML, ECL-differential interfaces with odd voltages," retrieved from URL http://www.planetanalog.com/ Jan. 21, 2003, 9 pages.

Heydari, Payam, "Design Issues in Low-Voltage High-Speed Current-Mode Logic Buffers," *GLSVLSI'03*, Apr. 28-29, 2003, Washington, DC, USA, 6 pages.

Integrated Circuit Systems, Inc., "HiPerClockS (TM) Application Note, 3.3V LVPECL Driver Termination," Aug. 2, 2002, 7 pages, retrieved from URL www.icst.com/products/hiperclocks.html.

Ju, Jeff, "Interfacing LVDS with other differential-I/O types," retrieved from URL www.edn.com, Oct. 30, 2003, pp. 81-84 and 86.

Kumeric, Marijan, et al., "Digitally tuneable on-chip line termination resistor for 2.6Gbit/s LVDS receiver in 0.25µ standard CMOS technology," in *Proceedings of the 27th European Solid-State Circuits Conference* (ESSCIRC 2001), Sep. 18-20, 2001, pp. 241-244.

Ma, Jimmy, "Termination Schemes and Design Guidelines for 3.3V LVPECL Driver," Application Note #73, Pericom Semiconductor Corporation, San Jose, CA, 2 pages, retrieved May 19, 2004 from URL www.pericom.com.

Maxim High-Frequency/Fiber Communications Group, "Introduction to LVDS, PECL, and CML," Application Note: HFAN-1.0, Rev. 0, Sep. 2000, pp. i-14.

Micrel Semiconductor, "High-Speed PECL and LVPECL Termination," (no date) 2 pages, retrieved from URL www.micrel.com/solutions.shtml.

Silicon Laboratories Product Sheet AN59, "Optimizing Design and Layout for the Si5318/20/21/64 Clock ICs," Rev. 1.0, Jun. 2005, 20 pages.

Von Herzen, Brian and Brunetti, Jon, "Virtex-E LVPECL Receivers in Multi-Drop Applications," XILINX Application Note: Virtex-E Family, XAPP237, v1.1, Feb. 24, 2000, 8 pages, retrieved from URL www.xilinx.com.

Yang, Ken, "Modified LDO Regulator Sinks PECL-Termination Current," *Planet Analog*, Jun. 28, 2005, 4 pages, retrieved Sep. 2, 2005 from URL http://www.planetanalog.com/showArticle?articleID=164903593.

\* cited by examiner

DIFFERENTIAL LINE TERMINATION TECHNIQUE

BACKGROUND

1. Field of the Invention

The present invention relates to integrated circuits, and more particularly to input/output buffers of integrated circuits.

2. Description of the Related Art

A differential output buffer on an integrated circuit may drive differential signal lines, e.g., traces on a printed circuit board, which are finite-length transmission lines. To reduce signal reflections on those differential transmission lines and corresponding degradation of signals on those transmission lines, the finite-length transmission lines are coupled to a termination impedance that makes the finite-length transmission lines behave as if they are infinite in length, i.e., the individual transmission lines are terminated by an impedance having a value approximately equal value to the characteristic impedance of a respective transmission line. By integrating termination resistors into the differential output buffer on the integrated circuit, the number of external resistors included on a printed circuit board including the integrated circuit may be reduced.

Although typical termination resistors included in the differential output buffer are designed to be equal to the input impedance of the load to which it is coupled, the actual output impedance may not match the input impedance of the load exactly, due to integrated circuit manufacturing process variations. Accordingly, reflections may degrade the signal and the single-ended, peak-to-peak output voltage level may vary according to the variation in resistor values, thereby reducing the power transferred to the load. Some techniques for impedance matching the load result in mismatches in the output impedances of individual nodes of a differential node, which may degrade the signal and power transfer to the load. In addition, currents flowing through termination resistors may dissipate substantial amounts of power, which decreases battery life in portable applications and increases costs related to packaging and cooling systems.

SUMMARY

A technique for terminating a differential signal line substantially matches the output impedance of a first node of a differential node to the output impedance of a second node of the differential node. The power dissipation associated with the technique is substantially less than twice the power delivered to a load impedance coupled to the differential signal line. In addition, the technique provides a peak-to-peak, single-ended output voltage on the differential output node that is substantially independent of integrated circuit manufacturing process tolerances.

In at least one embodiment of the invention, an apparatus includes a differential node coupled to provide a differential signal. The differential node includes a first node and a second node. The apparatus includes a first single-ended termination circuit that is coupled to the first node and that is responsive to a first reference voltage. The apparatus includes a second single-ended termination circuit that is coupled to the second node and that is responsive to a second reference voltage.

In at least one embodiment of the invention, a method includes single-endedly terminating individual ones of a first node of a differential node and a second node of a differential node. In at least one embodiment of the invention, the method includes maintaining a first voltage on the first node and maintaining a second voltage on the second node. The first voltage and the second voltage are based on at least a target common mode voltage of a signal on the differential node and a target single-ended, peak-to-peak voltage of the signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
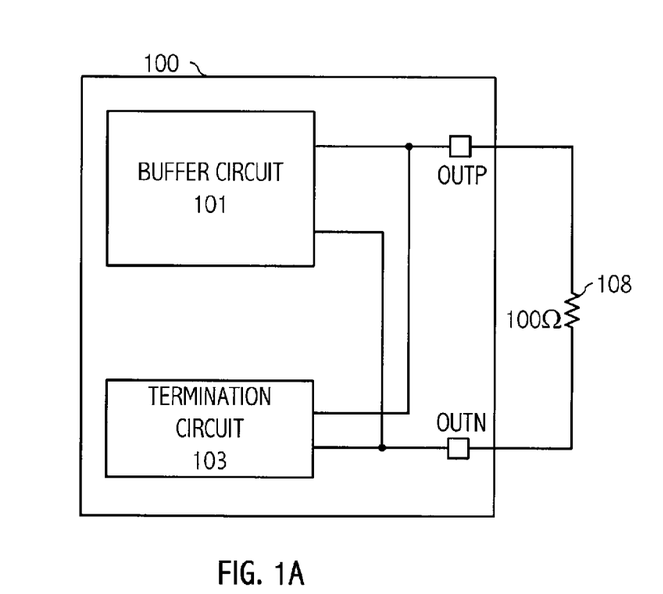
FIG. 1A illustrates a block diagram of an exemplary integrated circuit including a terminated output buffer circuit useful for explaining the present invention.

Referring to FIG. 1A, an exemplary low-voltage differential signaling (LVDS) output driver (e.g., integrated circuit 100) includes buffer circuit 101 and termination circuit 103 coupled to differential output node OUTP and OUTN. The LVDS output driver is coupled to an exemplary 100 ohms ($\Omega$) line (e.g., external impedance 108). An exemplary termination circuit 103 (FIG. 1B) matches external impedance 108 by including a 100 $\Omega$ termination impedance coupled across differential output node OUTP and OUTN, e.g., the impedance formed by resistors 104 and 106. The node between resistors 104 and 106 (e.g., node 105), which generates the common mode voltage of the output signal on differential output node OUTP and OUTN (e.g., an output signal driven by buffer circuit 101), is sensed by transconductance amplifier 102. Transconductance amplifier 102 compares the common mode voltage level of the differential signal on output node OUTP and OUTN (e.g., the voltage on node 105) to a fixed reference voltage level equal to a target common mode voltage level (e.g., Vcm). The target common mode voltage level may be generated by a bandgap voltage reference circuit (not shown) or other suitable technique for generating a stable reference voltage level. Transconductance amplifier 102 maintains the target common mode voltage level on node 105 by adjusting the output current of transconductance amplifier 102.

Figure 1B:
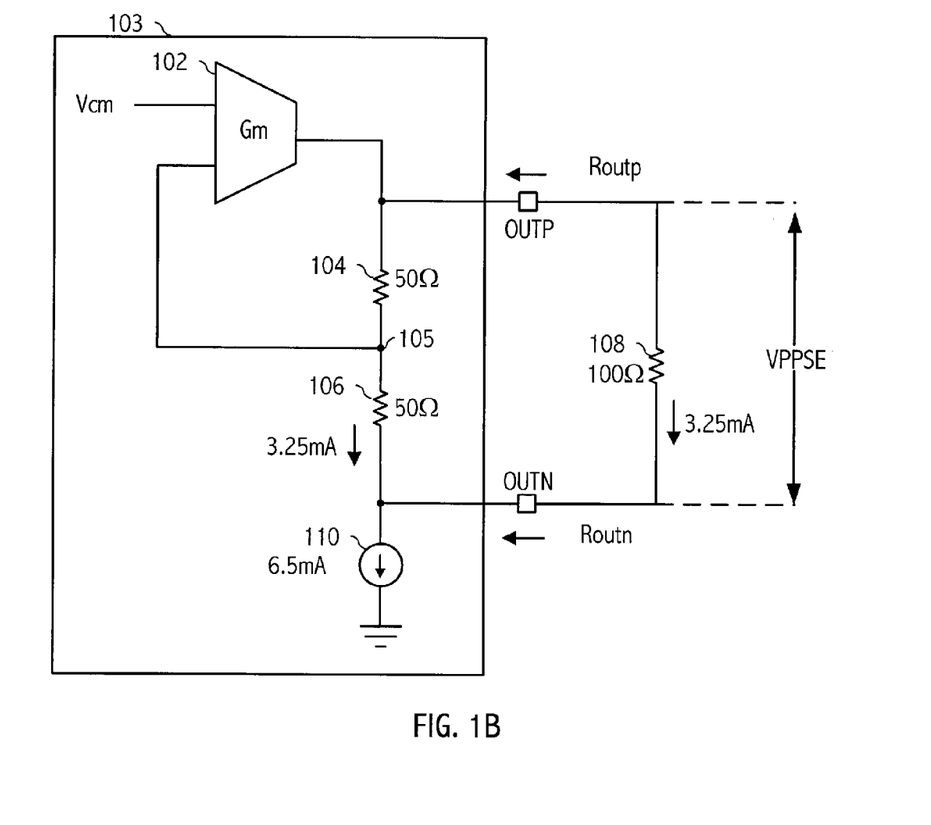
FIG. 1B illustrates a circuit diagram of an exemplary differential line termination circuit useful for explaining the present invention.

Current sink 110 establishes a current through external impedance 108 and a current through resistors 104 and 106. The current through resistors 104 and 106 is approximately equal to the current through external impedance 108 (e.g., 3.25 mA). Accordingly, current sink 110 sinks a current (e.g., 6.5 mA) that is approximately twice the current delivered to external impedance 108 (e.g., 3.25 mA). Thus, only approximately 50% of the current flowing through termination circuit 103 is transferred to the load.

The peak-to-peak, single-ended (Vppse) output voltage level of exemplary termination circuit 103 is dependent upon actual resistance values of resistors 104 and 106. Resistors 104 and 106 are subject to typical integrated circuit manufacturing process variations (e.g., 15% variation in an exemplary integrated circuit manufacturing process), resulting in variations in the output voltage on differential output node OUTP and OUTN. For example, if resistors 104 and 106 (e.g., designed to be 50 Ω each) are actually approximately 15% below the design value (e.g., 42.5 Ω each), the mismatch between the actual impedances of resistors 104 and 106 and the impedance of external impedance 108 changes Vppse to a voltage level (e.g., 299 mV) approximately 8% below the design value (e.g., 325 mV), which may not meet performance specifications in some applications. The efficiency of the circuit may also degrade, e.g., a greater current may flow through resistors 104 and 106 (e.g., 3.51 mA) than through external impedance 108 (e.g., 2.99 mA).

Figure 2A:
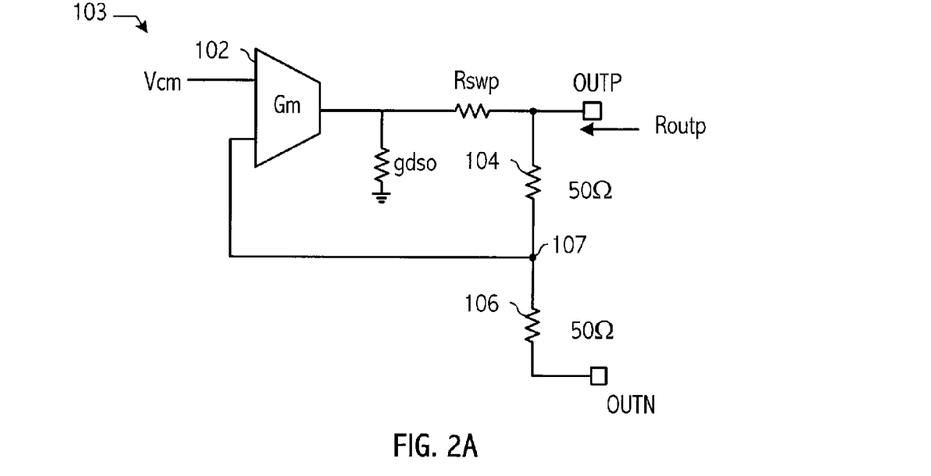
FIG. 2A illustrates a circuit diagram of the exemplary differential line termination circuit of FIG. 1B useful for explaining the present invention.

In addition, the impedances looking into individual nodes of differential output node OUTP and OUTN of termination circuit 103 are mismatched, i.e., the output impedance of OUTP and the output impedance of OUTN are not equal. Referring to FIG. 2A, characteristics of transconductance amplifier 102 are modeled as an ideal transconductance Gm with a finite output conductance gdso. Rswp models the resistance of a switch that alternately couples transconductance amplifier 102 to output node OUTP (e.g., for an output signal corresponding to a high data value) or output node OUTN (e.g., for an output signal corresponding to a low data value) according to a data value being conveyed by the output signal. The impedance looking into output node OUTP relative to ground is:

$$Routp = \frac{Rswp + 1/gdso}{1 + Gm/gdso}.$$

Figure 2B:
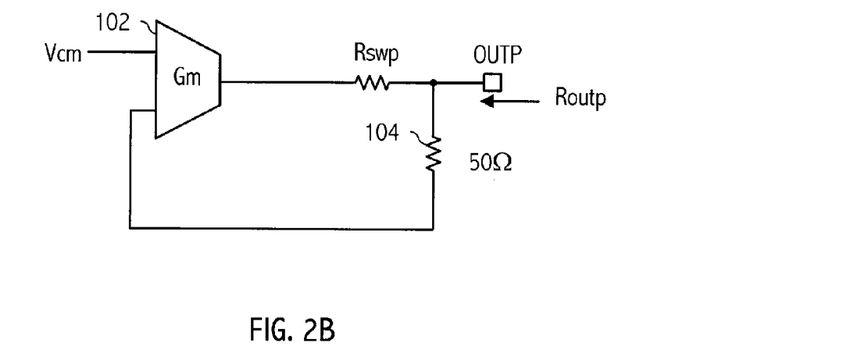
FIG. 2B illustrates a circuit diagram of an approximation of the exemplary differential line termination circuit of FIG. 1B useful for explaining the present invention.
Figure 2C:
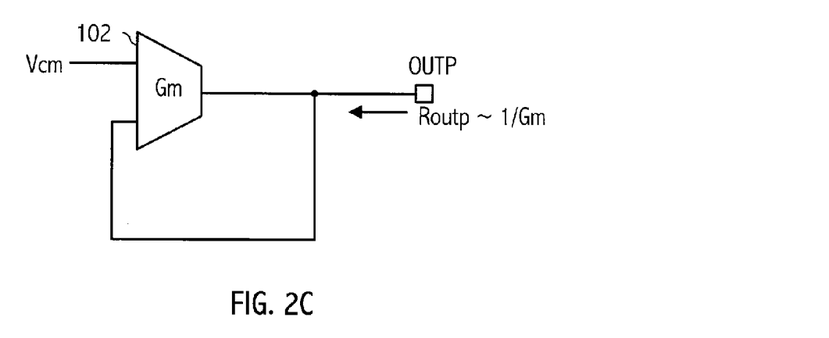
FIG. 2C illustrates a circuit diagram of an approximation of the exemplary differential line termination circuit of FIG. 1B useful for explaining the present invention.

Assuming that the output conductance of transconductance amplifier 102, gdso, is negligible, and that node 107, which is maintained at the target common mode voltage level, is a virtual ground, Routp of termination circuit 103 may be modeled by the circuit in FIG. 2B. However, since no current flows into the input of transconductance amplifier 102, output node OUTP is modeled as being at the same potential as the inverting input of transconductance amplifier 102 (FIG. 2C), resulting in an approximation of the impedance looking into output node OUTP: Routp≈1/Gm. Typically, 1/Gm is approximately 20-50 mA/V and Routp is approximately 20-50 Ω.

Figure 3A:
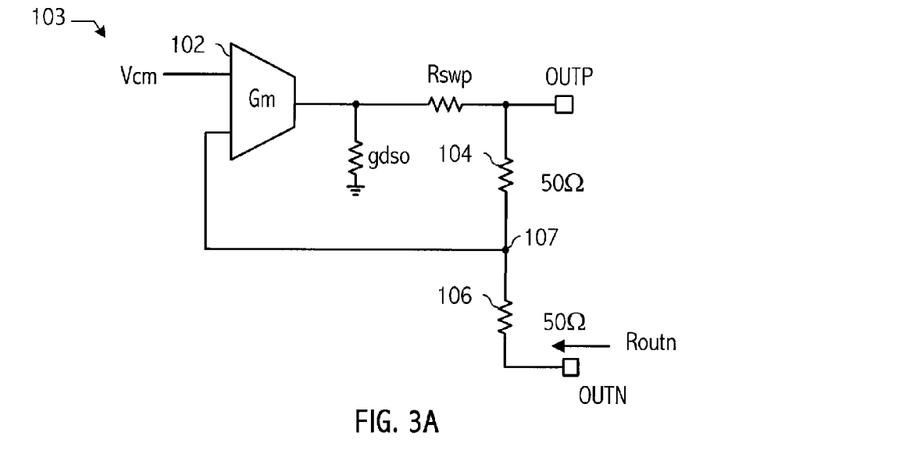
FIG. 3A illustrates a circuit diagram of the exemplary differential line termination circuit of FIG. 1B useful for explaining the present invention.

Referring to FIG. 3A, the impedance looking into output node OUTN relative to ground is:

$$Routn = \frac{1 + Gm*50 + gdso(2*50 + Rswp)}{Gm + gdso}.$$

Figure 3B:
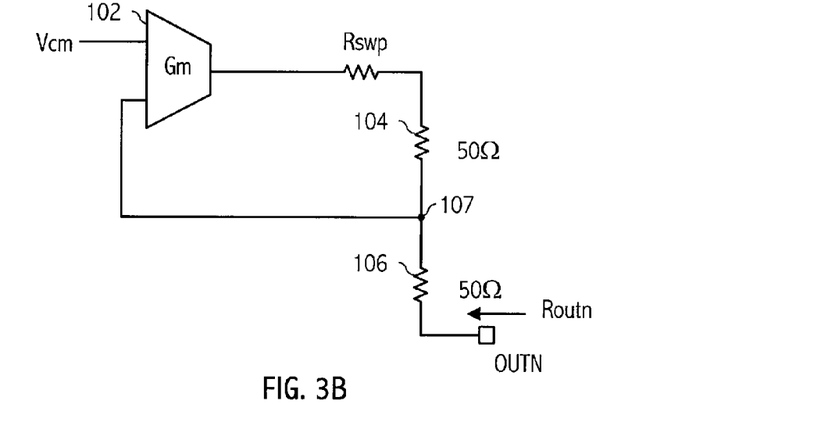
FIG. 3B illustrates a circuit diagram of an approximation of the exemplary differential line termination circuit of FIG. 1B useful for explaining the present invention.
Figure 3C:
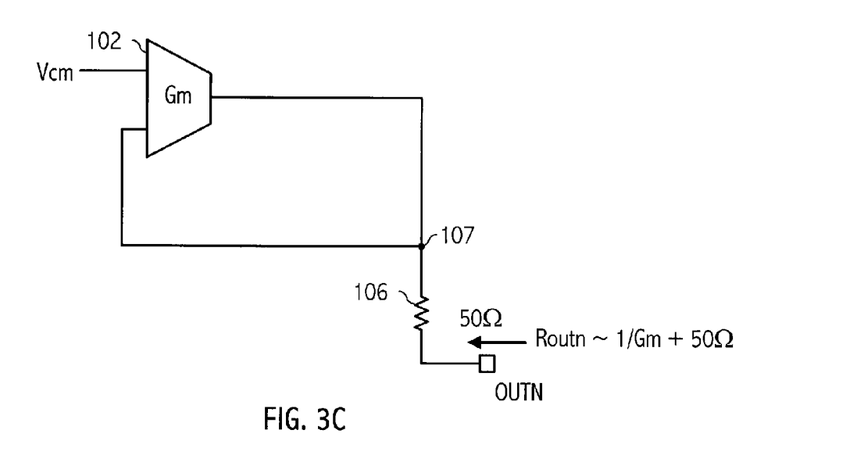
FIG. 3C illustrates a circuit diagram of an approximation of the exemplary differential line termination circuit of FIG. 1B useful for explaining the present invention.

Assuming that the output conductance of transconductance amplifier 102, gdso, is negligible, Routn of termination circuit 103 may be modeled by the circuit in FIG. 3B. In addition, if gdso is negligible, resistance Rswp and resistor 104, which are in series with the ideal transconductace Gm may also be ignored (FIG. 3C). However, resistor 106 cannot be ignored, resulting in an approximation of Routn ≈1/Gm+ (resistance of resistor 106) (e.g., 1/Gm+50 Ω). Typically, 1/Gm is approximately 20-50 mA/V and Routn is approximately 70-100 Ω. Routp and Routn have an impedance difference approximately equal to the resistance of resistor 106 (e.g., 50 Ω), which may result in reflections and impact system performance.

Figure 4:
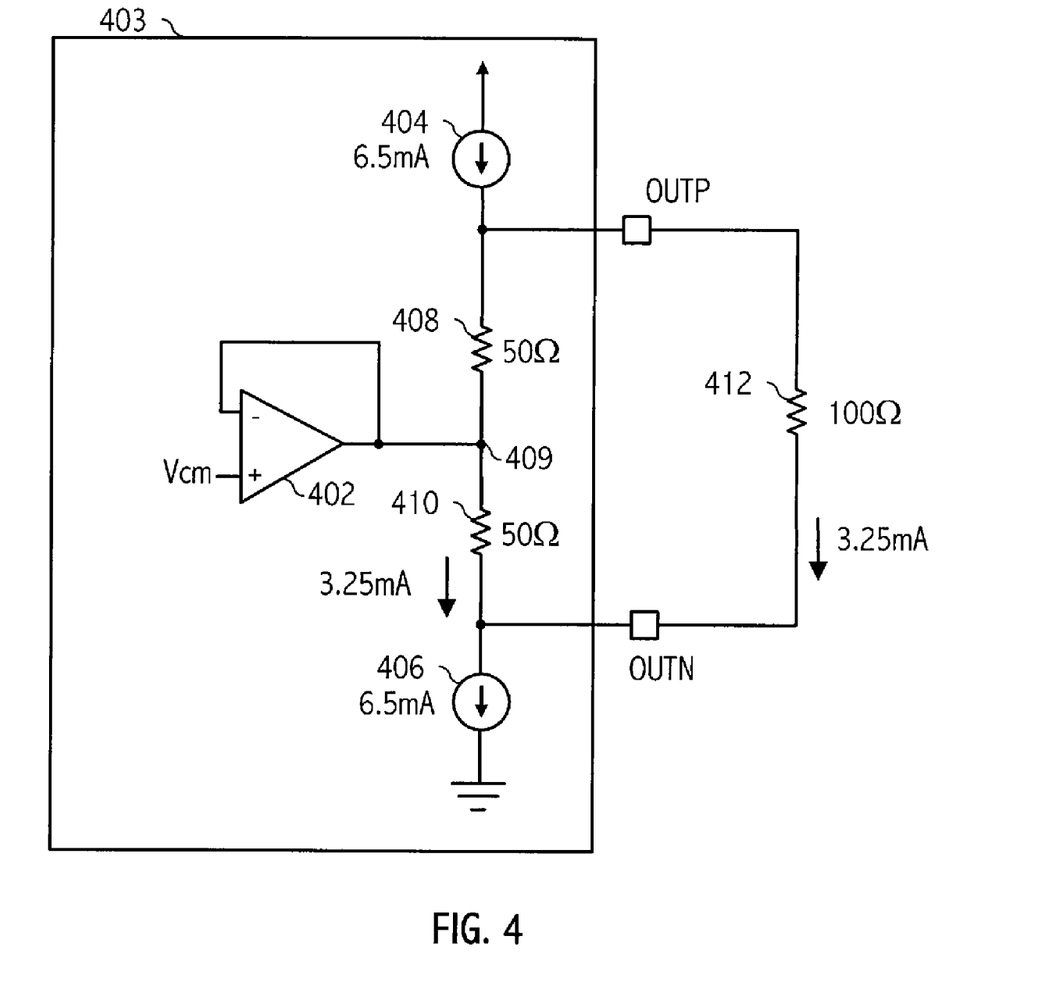
FIG. 4 illustrates a circuit diagram of an exemplary differential line termination circuit useful for explaining the present invention.

Referring to FIG. 4, rather than using a termination circuit having an amplifier driving one node of the differential output node OUTP and OUTN and the amplifier sensing between the termination resistors of termination circuit 103, an amplifier in an exemplary termination circuit may drive and sense a node between the termination resistors and between output node OUTP and output node OUTN of the differential output node. Termination circuit 403 effectively eliminates the impedance mismatch of output node OUTP and output node OUTN of the differential output node by coupling amplifier 402 to node 409, which is between resistors 408 and 410 and between output node OUTP and output node OUTN of the differential output node. Termination circuit 403 includes a current source (e.g., current source 404) that provides current that flows through external impedance 412 and the termination resistors 408 and 410. Although termination circuit 403 matches the impedances of output node OUTP and output node OUTN, termination circuit 403 sources and sinks at least twice the current delivered to an external impedance (e.g., external impedance 412) and the Vppse output voltage level depends upon actual resistance values of resistors 408 and 410.

Figure 5:
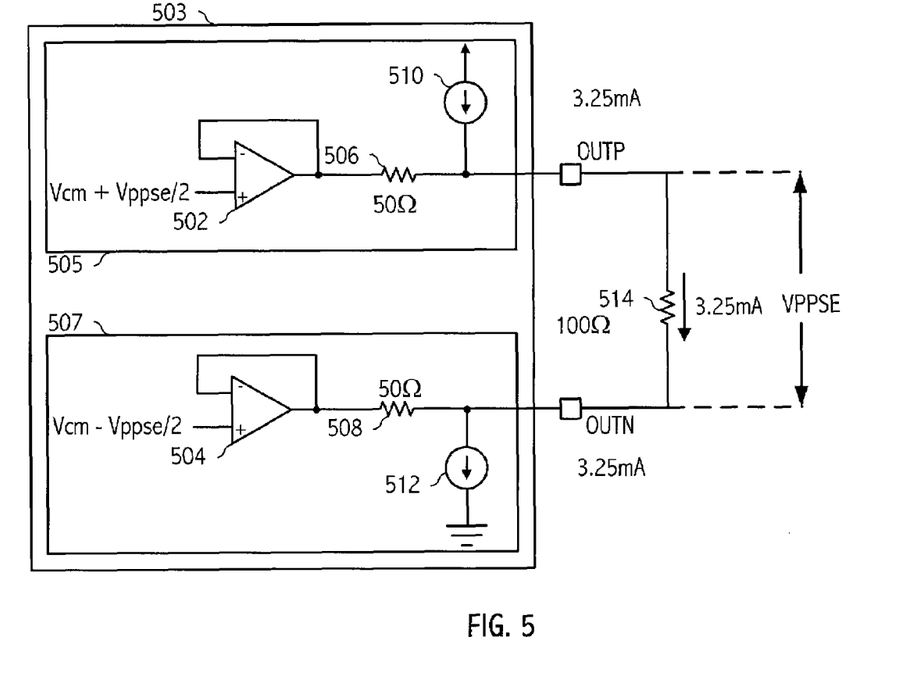
FIG. 5 illustrates a circuit diagram of an exemplary differential line termination circuit consistent with at least one embodiment of the invention.

A termination circuit consistent with the present invention matches the output impedances of output node OUTP and output node OUTN of a differential output node, provides a peak-to-peak, single-ended output voltage level that is effectively independent of integrated circuit manufacturing process tolerances, and may dissipate substantially less than twice the power delivered to an external impedance. Referring to FIG. 5, in at least one embodiment of the present invention, a termination circuit (e.g., termination circuit 503) independently terminates individual nodes (e.g., output node OUTP and output node OUTN) of a differential node (e.g., differential output node OUTP and OUTN). Termination circuit 503 includes two separate, single-ended termination circuits (e.g., termination circuit 505 and termination circuit 507) and receives two distinct voltage reference levels (e.g., Vcm+Vppse/2 and Vcm−Vppse/2).

Termination circuit 505 and termination circuit 507 include operational amplifiers 502 and 504, respectively, and resistors 506 and 508, respectively. In an embodiment, termination resistors 506 and 508 are designed to be nominally equal to each other and equal to half the nominal resistance of external impedance 514. These values may vary under typical manufacturing conditions. As used herein, a nominal value (e.g., a nominal resistance value) refers to a specified value that is between (typically halfway between) maximum and minimum limits of a tolerance range for the value. Termination circuit 505 includes current source 510 and termination circuit 507 includes current sink 512, which source and sink, respectively, a current that flows through external impedance 514 (e.g., 3.25 mA). Amplifiers 502 and 504 are voltage operational amplifiers (i.e., buffered operational amplifiers or low output resistance operational amplifiers). However, in at least one embodiment of the invention, termination circuits 505 and 507 may include operational transconductance amplifiers (i.e., unbuffered operational amplifiers, which have output impedances much greater than the load impedance and input impedances much greater than source impedances).

In at least one embodiment of the invention, the non-inverting terminal of operational amplifier 502 receives a reference voltage level equivalent to the sum of a target common mode voltage level and half of a target peak-to-peak, single-ended voltage level (i.e., Vcm+Vppse/2). The inverting terminal receives the voltage on the output node of operational amplifier 502. On the output node of operational amplifier 502, operational amplifier 502 maintains a voltage level equal to the reference voltage level on the non-inverting input (e.g., Vcm+Vppse/2). In at least one embodiment of the invention, no substantial current flows through resistor 506 because the reference voltage level (i.e., the sum of the target common mode voltage and the target peak-to-peak, single-ended voltage) is equal to the voltage on output node OUTP. Accordingly there is no substantial voltage drop across resistor 506.

Operational amplifier 504 receives a reference voltage level equivalent to the difference of a target common mode voltage and half of a target peak-to-peak, single-ended voltage on the non-inverting terminal (i.e., Vcm−Vppse/2). The inverting terminal receives the voltage on the output node of operational amplifier 504. On the output node of operational amplifier 504, operational amplifier 504 maintains a voltage level equal to the reference voltage level on the non-inverting input. In at least one embodiment of the invention, no current flows through resistor 508 because the reference voltage level (i.e., the difference of the target common mode voltage level and the target peak-to-peak, single-ended voltage level) is equal to the voltage on output node OUTN. Accordingly, there is no substantial voltage drop across resistor 508. Termination circuit 503 sinks current equal to approximately the current through external impedance 514, in addition to the currents of operational amplifiers 502 and 504 (e.g., a total of approximately 4.75 mA for the entire circuit in at least one embodiment of the invention).

Although an embodiment of termination circuit 503 that receives the reference voltage levels described above and generates substantially no current through resistors 506 and 508 dissipates less power than embodiments that receive different reference voltage levels and generate some current flowing through resistors 506 and 508, the invention is not limited thereto. In some embodiments, some current may flow through resistors 506 and 508, but substantially less than the approximately 50% described in relation to FIGS. 1A and 4. In at least one embodiment of the invention, termination circuits 505 and 507 receive reference voltages that vary from a common mode voltage level by a magnitude other than half the peak-to-peak, single-ended voltage level, and generate some current in resistors 506 and 508, respectively. Although some current flows through resistors 506 and 508, such embodiments may dissipate substantially less power than termination circuit 103 and termination circuit 403, which source and sink at least twice the current flowing through an external load. In addition, such embodiments match the output impedance of output node OUTP and output node OUTN of the differential output node.

In at least one embodiment of the invention, amplifier 502 and amplifier 504 include at least a portion of resistor 506 and/or at least a portion of resistor 508 within amplifier 502 and amplifier 504, respectively. In at least one embodiment of the invention, amplifier 502 and amplifier 504 have sufficient voltage headroom (e.g., embodiments coupled to higher power supply voltage levels) to include at least a portion of current source 510 and/or at least a portion of current sink 512 within amplifier 502 and amplifier 504, respectively. Such an embodiment reuses current generated by amplifiers 502 and 504 to drive the external impedance 514, reducing power dissipation of termination circuit 503 as compared to embodiments that include circuit implementations of current source 510 and current sink 512 separate from amplifier 502 and amplifier 504, respectively.

Figure 6:
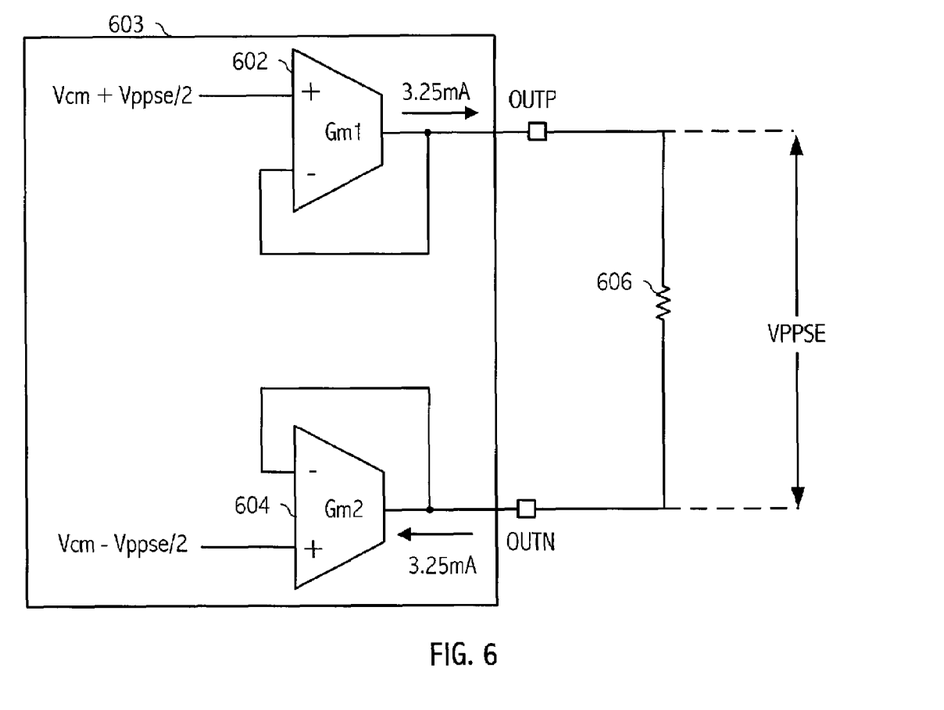
FIG. 6 illustrates a circuit diagram of an exemplary differential line termination circuit consistent with at least one embodiment of the invention.

Referring to FIG. 6, in at least one embodiment of the invention, transconductance amplifiers 602 and 604 of termination circuit 603 provide current to external impedance 606. For example, amplifier 602 and amplifier 604 may have sufficient voltage headroom to provide all or at least a substantial portion of the current driving the external impedance 606, and thereby reuse current, or amplifier 602 and amplifier 604 may include separate circuit implementations of a current source (e.g., 3.25 mA current source) and a current sink (e.g., 3.25 mA current sink), respectively. The impedance looking into output node OUTP is 1/Gm1 and the impedance looking into output node OUTN is 1/Gm2, where Gm1 and Gm2 are transconductances of amplifiers 602 and 604, respectively. The value of 1/Gm1 is approximately equal to the value of 1/Gm2 (e.g., approximately 50 Ω) and both are approximately equal to half of a nominal differential termination impedance, i.e., external impedance 606 (e.g., 100 Ω differential line impedance). The output current of amplifier 602 is equal to the current through external impedance 606 (e.g., 3.25 mA). Termination circuit 603 matches the impedance looking into output node OUTP of the differential node and the impedance looking into output node OUTN of the differential node, sources and sinks substantially less than twice the current flowing through external impedance 606, and provides a Vppse on differential output node OUTP and OUTN that is substantially independent of process variations. In at least one embodiment of the invention, Gm1 and Gm2 are not approximately equal although the sum of 1/Gm1 and 1/Gm2 is approximately equal to the nominal differential termination impedance.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. For example, while the invention has been described in an embodiment in which an output buffer is LVDS standard-compliant, one of skill in the art will appreciate that the teachings herein can be utilized with other differential signaling standards. Although in the exemplary electrical systems the load impedance is 100 Ω for a differential signal line, techniques described herein are applicable to other load impedance values. Variations and modifications of the embodiments disclosed herein may be made based on the description set forth herein without departing from the scope and spirit of the invention as set forth in the following claims.

What is claimed is:

1. An apparatus comprising:
    a differential node coupled to provide a differential signal, the differential node including a first node and a second node;
    a first single-ended termination circuit coupled to the first node and responsive to a first reference voltage; and
    a second single-ended termination circuit coupled to the second node and responsive to a second reference voltage;
    wherein the first single-ended termination circuit comprises a first amplifier circuit including a first input node responsive to the first reference voltage and a second input node responsive to an output of the first amplifier circuit;
    wherein the second single-ended termination circuit comprises a second amplifier circuit including a first input node responsive to the second reference voltage and a second input node responsive to an output of the second amplifier circuit.

2. The apparatus, as recited in claim 1,
    wherein the first single-ended termination circuit comprises a first resistor coupled between the first node and the output of the first amplifier circuit; and
    wherein the second single-ended termination circuit comprises a second resistor coupled between the second node and the output of the second amplifier circuit.

3. The apparatus, as recited in claim 2, further comprising:
    wherein the first single-ended termination circuit comprises a current source coupled to the first node; and
    wherein the second single-ended termination circuit comprises a current sink coupled to the second node.

4. The apparatus, as recited in claim 3, further comprising:
    an external impedance coupled to the differential node;
    wherein the current source and the current sink are respectively coupled to source and sink currents of approximately the same magnitude, substantially more than fifty percent of the current provided by the current source flowing from the first node through the external impedance and substantially more than fifty percent of the current received by the current sink flowing from the external impedance through the second node.

5. The apparatus, as recited in claim 3, further comprising:
    an external impedance coupled to the differential node;
    wherein the current source and the current sink are respectively coupled to source and sink currents of approximately the same magnitude, substantially all of the current provided by the current source flowing from the first node through the external impedance and substantially all of the current received by the current sink flowing from the external impedance through the second node and substantially no current flowing through the first and second resistors.

6. The apparatus, as recited in claim 1, wherein the first and second reference voltages are based on at least a target common mode voltage level of the differential signal and a target single-ended, peak-to-peak voltage level of the differential signal.

7. The apparatus, as recited in claim 1, wherein:
    a level of the first reference voltage is approximately equal to a sum of a target common mode voltage level of the differential signal and approximately half a target single-ended, peak-to-peak voltage level of the differential signal; and
    a level of the second reference voltage is approximately equal to a difference between the target common mode voltage level and approximately half the target single-ended, peak-to-peak voltage level.

8. The apparatus, as recited in claim 2, wherein a voltage level on the differential node is substantially independent of variations in actual resistance values of the first and second resistors as compared to nominal resistance values of the first and second resistors.

9. The apparatus, as recited in claim 1, wherein the first node has a first output impedance value and the second node has a second output impedance value, the sum of the first and second output impedance values being substantially equal to a nominal output impedance value.

10. The apparatus, as recited in claim 1, wherein the first node has a first output impedance value and the second node has a second output impedance value, the first and second output impedance values being substantially equal.

11. An apparatus comprising:
    a differential node coupled to provide a differential signal, the differential node including a first node and a second node;
    a first single-ended termination circuit coupled to the first node and responsive to a first reference voltage; and
    a second single-ended termination circuit coupled to the second node and responsive to a second reference voltage,
    wherein individual ones of the first and second nodes of the differential node are terminated to respective signal ground nodes.

12. The apparatus, as recited in claim 11,
    wherein the first single-ended termination circuit comprises a first amplifier circuit including a first input node responsive to the first reference voltage and a second input node responsive to an output of the first amplifier circuit;
    wherein the second single-ended termination circuit comprises a second amplifier circuit including a first input node responsive to the second reference voltage and a second input node responsive to an output of the second amplifier circuit.

13. A method comprising:
    single-endedly terminating individual ones of a first node of a differential node and a second node of the differential nodes,
    wherein the single-endedly terminating individual ones of a first node of a differential node and a second node of the differential node comprises:
        maintaining a first voltage level on the first node;
        maintaining a second voltage level on the second node; and
    wherein the first voltage level and the second voltage level are based on at least a target common mode voltage level of a signal on the differential node and a target single-ended, peak-to-peak voltage level of the signal,
    wherein the first voltage level is approximately equal to a sum of a target common mode voltage level of the signal and approximately half a target single-ended, peak-to-peak voltage level of the signal, and wherein the second voltage level is approximately equal to a difference between the target common mode voltage level and approximately half the target single-ended, peak-to-peak voltage level.

14. The method, as recited in claim 13, wherein the single-endedly terminating individual ones of a first node of a differential node and a second node of the differential node comprises:

providing a first current to the first node;
sinking a second current from the second node; and
wherein substantially all of the current through the first node is provided to a load coupled to the first and second nodes and substantially all of the current through the second node is received from the load.

15. The method, as recited in claim 13, further comprising:
dissipating approximately no power in termination impedances of individual single-ended termination circuits coupled to respective ones of the first node and the second node.

16. A method comprising:
single-endedly terminating individual ones of a first node of a differential node and a second node of the differential node,
wherein the single-endedly terminating individual ones of a first node of a differential node and a second node of the differential node comprises:
providing a first current to the first node;
sinking a second current from the second node; and
wherein substantially more than fifty percent of the current through the first node is provided to a load coupled to the first and second nodes and substantially more than fifty percent of the current through the second node is received from the load.

17. The method, as recited in claim 16, wherein the single-endedly terminating individual ones of a first node of a differential node and a second node of the differential node comprises:
maintaining a first voltage level on the first node;
maintaining a second voltage level on the second node; and
wherein the first voltage level and the second voltage level are based on at least a target common mode voltage level of a signal on the differential node and a target single-ended, peak-to-peak voltage level of the signal.

18. The method, as recited in claim 17, wherein:
the first voltage level is approximately equal to a sum of a target common mode voltage level of the signal and approximately half a target single-ended, peak-to-peak voltage level of the signal; and
the second voltage level is approximately equal to a difference between the target common mode voltage level and approximately half the target single-ended, peak-to-peak voltage level.

19. The method, as recited in claim 16, wherein a voltage level on the differential node is substantially independent of variations in actual output impedance values of the first and second nodes as compared to nominal output impedance values of the first and second nodes.

20. The method, as recited in claim 16, wherein the first node has a first output impedance value and the second node has a second output impedance value, the sum of the first and second output impedance values being substantially equal to a nominal output impedance value.

21. The method, as recited in claim 16, wherein the first node has a first output impedance value and the second node has a second output impedance value, the first and second output impedance values being substantially equal.

22. An apparatus comprising:
a differential node including a first node and a second node; and
means for matching a combined output impedance of the first node and the second node to a load impedance by single-endedly terminating the first node and single-endedly terminating the second nodes,
wherein substantially more than fifty percent of the current flowing into the first node flows through an external load coupled to the differential node and substantially more than fifty percent of the current flowing from the second node flows through the external load.

23. The apparatus, as recited in claim 22, wherein the means for matching comprises:
means for maintaining a first voltage level on the first node;
means for maintaining a second voltage level on the second node; and
wherein the first voltage level and the second voltage level are based on at least a target common mode voltage level of a signal on the differential node and a target single-ended, peak-to-peak voltage level of the signal.

24. The apparatus, as recited in claim 23, wherein:
the first voltage level is approximately a sum of a target common mode voltage level of the signal and approximately half a target single-ended, peak-to-peak voltage level of the signal; and
the second voltage level is approximately a difference between the target common mode voltage level and approximately half the target single-ended, peak-to-peak voltage level.

25. The apparatus, as recited in claim 22, wherein substantially all of the current flowing into the first node flows through an external load coupled to the differential node and substantially all of the current flowing from the second node flows through the external load.

26. The apparatus, as recited in claim 23, wherein a voltage level on the differential node is substantially independent of variations in actual impedances included in the means for maintaining the first voltage as compared to nominal values of impedances included in the means for maintaining the second voltage.

27. The apparatus, as recited in claim 22, wherein the first node has a first output impedance value and the second node has a second output impedance value, the sum of the first and second output impedance values being substantially equal to a nominal output impedance value.

28. The apparatus, as recited in claim 22, wherein the first node has a first output impedance value and the second node has a second output impedance value, the first and second output impedance values being substantially equal.

* * * * *

UNITED STATES PATENT AND TRADEMARK OFFICE
CERTIFICATE OF CORRECTION

PATENT NO.         : 7,508,235 B2
APPLICATION NO. : 11/422789
DATED                : March 24, 2009
INVENTOR(S)       : Henry Singor It is certified that error appears in the above-identified patent and that said Letters Patent is hereby corrected as shown below:

Col. 8, claim 13, line 51, please replace "nodes," with --node,--
Col. 10, claim 22, line 14, please replace "nodes," with --node,--

Signed and Sealed this

Fifth Day of May, 2009

JOHN DOLL
*Acting Director of the United States Patent and Trademark Office*